United States Patent
Nagappa et al.

(10) Patent No.: US 11,577,856 B1
(45) Date of Patent: Feb. 14, 2023

(54) DUAL SIDED AIRCRAFT LIGHT ASSEMBLY

(71) Applicant: HONEYWELL INTERNATIONAL INC., Charlotte, NC (US)

(72) Inventors: Raghavendra Nagappa, Bangalore (IN); Indrajit Boiragi, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/658,898

(22) Filed: Apr. 12, 2022

(30) Foreign Application Priority Data

Feb. 28, 2022 (IN) .............................. 202211010657

(51) Int. Cl.
*F21V 5/04* (2006.01)
*B64D 47/04* (2006.01)
*F21Y 115/10* (2016.01)

(52) U.S. Cl.
CPC ................ *B64D 47/04* (2013.01); *F21V 5/04* (2013.01); *B64D 2203/00* (2013.01); *F21Y 2115/10* (2016.08)

(58) Field of Classification Search
CPC ....... B64D 47/04; B64D 2203/00; F21V 5/04; F21Y 2115/10
See application file for complete search history.

(56) References Cited

U.S. PATENT DOCUMENTS

| | | | |
|---|---|---|---|
| 8,469,546 B2 | 6/2013 | Pedersen | |
| 9,772,100 B2 | 9/2017 | Zhou et al. | |
| 2005/0099810 A1* | 5/2005 | Tasson | F21S 43/15 362/249.07 |
| 2011/0235330 A1 | 9/2011 | Pedersen et al. | |
| 2014/0369060 A1* | 12/2014 | Zhang | F21S 43/26 29/592.1 |
| 2015/0023023 A1* | 1/2015 | Livesay | H01L 33/64 362/294 |

FOREIGN PATENT DOCUMENTS

| | | |
|---|---|---|
| CN | 205579344 U | 9/2016 |
| CN | 206572303 U | 10/2017 |
| CN | 207094341 U | 3/2018 |
| CN | 208312098 U | 1/2019 |
| CN | 209116166 U | 7/2019 |
| CN | 209371003 U | 9/2019 |

* cited by examiner

*Primary Examiner* — Evan P Dzierzynski
(74) *Attorney, Agent, or Firm* — Lorenz & Kopf, LLP

(57) ABSTRACT

A dual sided aircraft light assembly includes a mount structure, a plurality of first light emitters, a plurality of first optics, a plurality of second light emitters, and a plurality of second optics. The first light emitters are disposed such that, upon being energized, each emits light in a first direction that is at an acute angle relative to a reference line that extends in a reference direction. The first optics are configured to focus the light emitted from the first light emitters into a first light beam directed in the first direction. The second light emitters are disposed such that, upon being energized, each emits light in a second direction that is at an obtuse angle relative to the reference line and reference direction. The second optics focus the light emitted from the second light emitters into a second light beam directed in the second direction.

20 Claims, 5 Drawing Sheets

DUAL SIDED AIRCRAFT LIGHT ASSEMBLY

CROSS-REFERENCE TO RELATED APPLICATION

This application claims priority to India Provisional Patent Application No. 202211010657, filed Feb. 28, 2022, the entire content of which is incorporated by reference herein.

TECHNICAL FIELD

The present invention generally relates to aircraft exterior lighting, and more particularly relates to a dual sided aircraft light assembly.

BACKGROUND

In the aviation industry, the pushback operation is a procedure in which an aircraft is pushed backwards away from its parking position, such as an airport gate, by external power, such as a tractor. To implement the operation, the tractor must be connected to the aircraft and communications must be established between the aircraft and the tractor operator throughout the pushback. Thus, a pushback can take several minutes, which can lead to reduced operational efficiency.

More modern aircraft are being designed with electrical, auto reversible propulsion. These aircraft will thus have onboard capability to pushback, without the need for any external power source. During a nighttime pushback with such onboard capability, proper illumination will be needed so that the aircraft pilot and ground crew can see the entire pushback area. Unfortunately, presently known exterior lights are not capable of illuminating the rear side of the aircraft with a single light when mounted on the landing gear.

Hence, there is a need for an aircraft light assembly that can be mounted on the landing gear of an aircraft and provide illumination both forward and rearward of the aircraft. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a dual sided aircraft light assembly includes a mount structure, a plurality of first light emitters, a plurality of first optics, a plurality of second light emitters, a plurality of second optics, a first lens, and a second lens. The mount structure is adapted to be mounted to an aircraft landing gear. The first light emitters are coupled to the mount structure. Each first light emitter is disposed such that, upon being electrically energized, each first light emitter emits light in a first direction that is at an acute angle relative to a reference line that extends in a reference direction. The first optics are disposed adjacent to the plurality of first light emitters. Each first optic is associated with and is disposed to receive the light emitted from a different one of the first light emitters. The first optics are configured to focus the light emitted from the first light emitters into a first light beam that is directed in the first direction. The second light emitters are coupled to the mount structure. Each second light emitter is disposed such that, upon being energized, each second light emitter emits light in a second direction that is at an obtuse angle relative to the reference line and the reference direction. The second optics are disposed adjacent to the plurality of second light emitters. Each second optic is associated with and is disposed to receive the light emitted from a different one of the second light emitters. The second optics are configured to focus the light emitted from the second light emitters into a second light beam that is directed in the second direction. The first lens is coupled to and encloses the first light emitters and the first optics. The second lens is coupled to and encloses the second light emitters and the second optics.

In another embodiment, an aircraft includes a fuselage, landing gear coupled to the fuselage, and at least one dual sided aircraft light assembly coupled to at least a portion of the landing gear. The at least one dual sided aircraft light assembly includes a mount structure, a plurality of first light emitters, a plurality of first optics, a plurality of second light emitters, a plurality of second optics, a first lens, and a second lens. The mount structure is mounted on the aircraft landing gear. The first light emitters are coupled to the mount structure. Each first light emitter is disposed such that, upon being electrically energized, each first light emitter emits light in a first direction that is at an acute angle relative to a reference line that extends in a reference direction. The first optics are disposed adjacent to the plurality of first light emitters. Each first optic is associated with and is disposed to receive the light emitted from a different one of the first light emitters. The first optics are configured to focus the light emitted from the first light emitters into a first light beam that is directed in the first direction. The second light emitters are coupled to the mount structure. Each second light emitter is disposed such that, upon being energized, each second light emitter emits light in a second direction that is at an obtuse angle relative to the reference line and the reference direction. The second optics are disposed adjacent to the plurality of second light emitters. Each second optic is associated with and is disposed to receive the light emitted from a different one of the second light emitters. The second optics are configured to focus the light emitted from the second light emitters into a second light beam that is directed in the second direction. The first lens is coupled to and encloses the first light emitters and the first optics. The second lens is coupled to and encloses the second light emitters and the second optics.

Furthermore, other desirable features and characteristics of the dual sided aircraft light assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
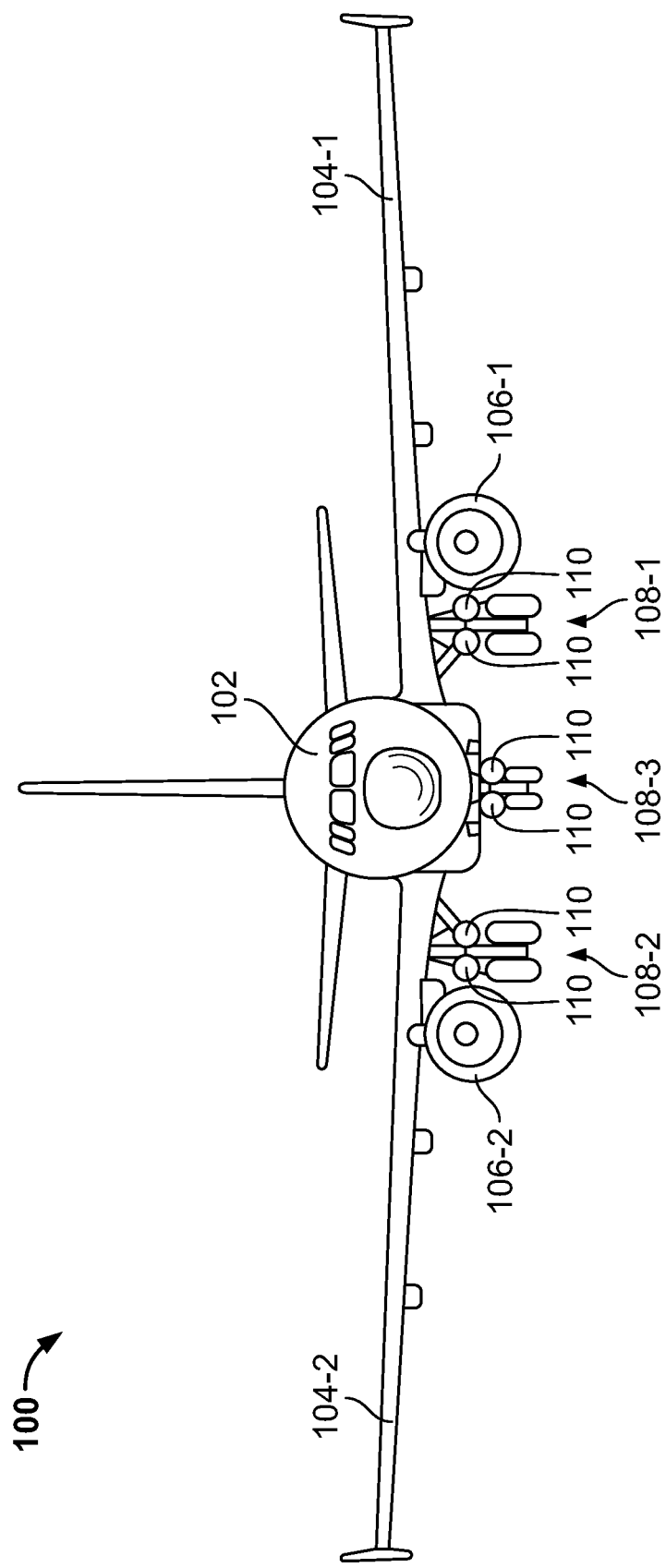
FIG. 1 depicts a simplified front view of one embodiment of an aircraft with its landing gear extended.

Referring first to FIG. 1, an example embodiment of an aircraft 100 is depicted. The depicted aircraft 100 includes a fuselage 102 having coupled thereto a pair of wings 104 (104-1, 104-2), a pair of engines 106 (106-1, 106-2), and landing gear 108 (108-1, 108-2, 108-3). It will be appreciated that various other aircraft assemblies and components may also be coupled to, and disposed within, the fuselage 102. It will additionally be appreciated that although the depicted aircraft 100 is a turbojet aircraft, the present disclosure encompasses various other types of aircraft including, for example, rotor craft, helicopters, unmanned aerial vehicles, and the like.

The landing gear 106, at least in the depicted embodiment, includes main landing gear 108-1, 108-2, and nose landing gear 108-3, all of which are depicted in an extended position. As may be appreciated, at least for the depicted aircraft 100, the landing gear may be selectively moved between the extended position and a retracted position. It will also be appreciated that in other embodiments the landing gear 108 may be fixed and/or it may include more or less than this number of landing gear arrangements.

No matter the number and configuration of the landing gear 108, at least a portion of the landing gear 108 has at least one dual sided aircraft light assembly 110 coupled thereto. The aircraft 100 in the depicted embodiment has two light assemblies 110 coupled to each of the main landing gear 108-1, 108-2 and to the nose landing gear 108-3. It will be appreciated, however, that this is merely one example embodiment and that in other embodiments more or less than two light assemblies 110 may be coupled to each landing gear 108 and/or not all of the landing gear 108 of the aircraft 100 may one or more light assemblies 110 coupled thereto.

Figure 2:
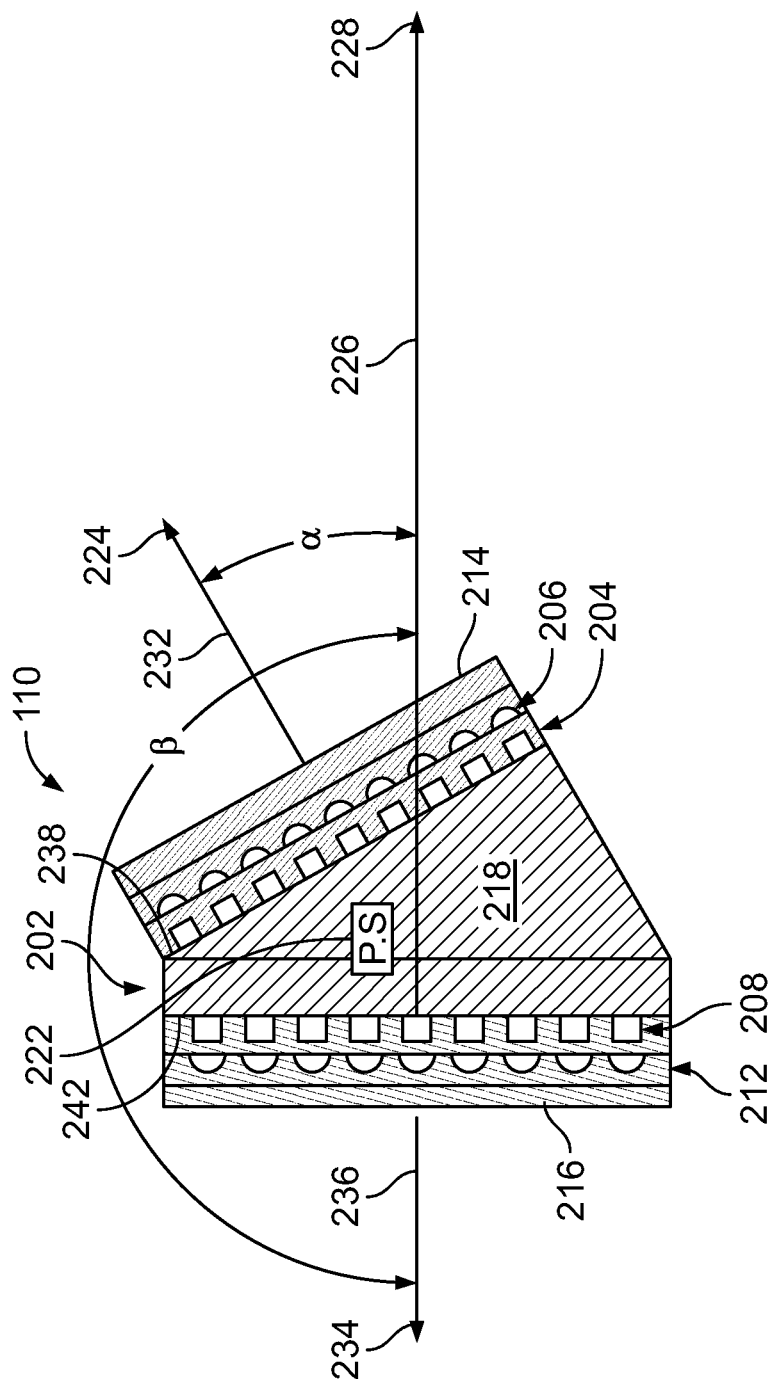
FIG. 2 depicts a simplified side view of one embodiment of a dual sided aircraft light assembly that may be mounted on the landing gear of the aircraft in FIG. 1.
Figure 3:
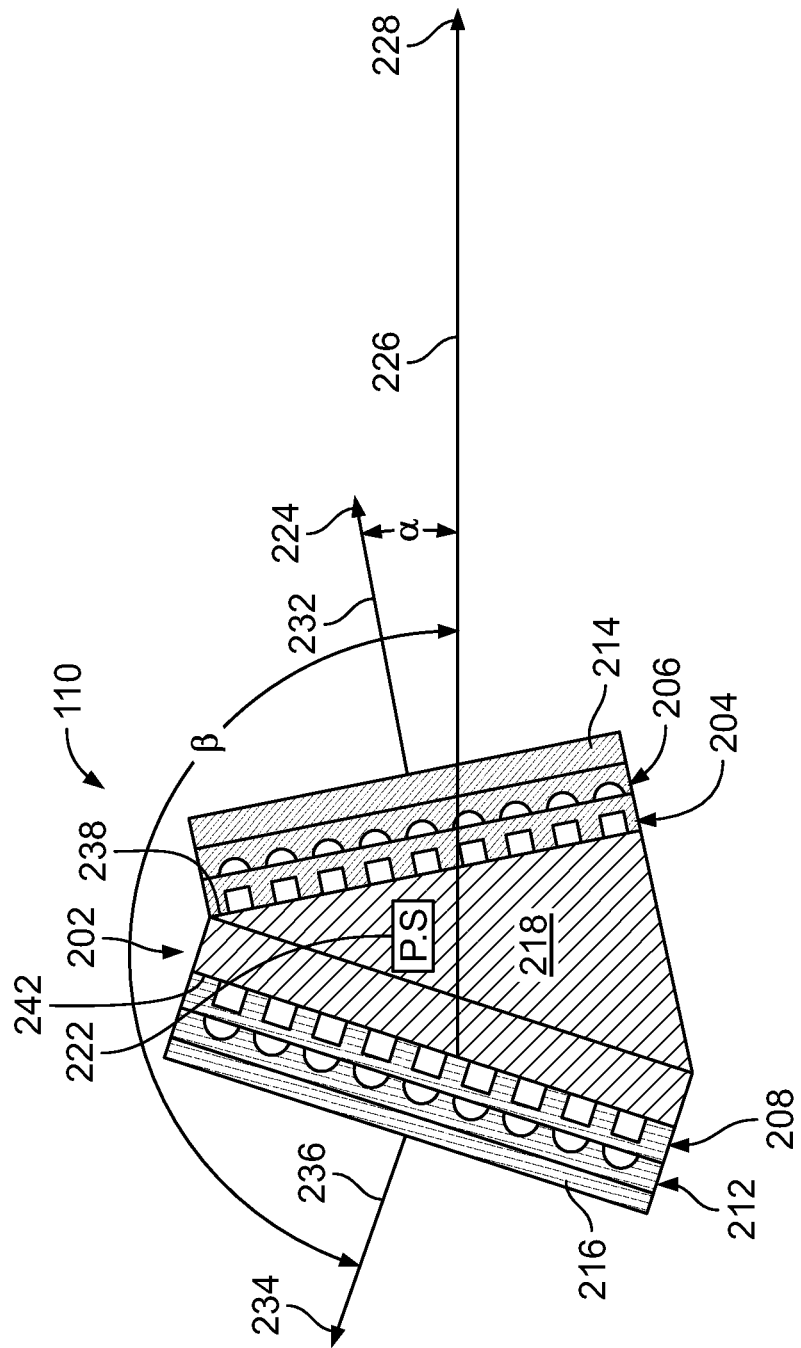
FIG. 3 depicts a simplified side view of another embodiment of a dual sided aircraft light assembly that may be mounted on the landing gear of the aircraft in FIG. 1.

Turning now to FIGS. 2 and 3, one embodiment of a dual sided aircraft light assembly 110 is depicted and will now be described. The depicted light assembly 110 includes a mount structure 202, a plurality of first light emitters 204, a plurality of first optics 206, a plurality of second light emitters 208, a plurality of second optics 212, a first lens 214, and a second lens 216. The mount structure 202 is adapted to be mounted on the aircraft landing gear 108. Indeed, in FIG. 1 it is mounted on the landing gear 108. In the depicted embodiment, the mount structure 202 comprises a housing 218 within which a power supply circuit 222 is disposed.

The plurality of first light emitters 204 are coupled to the mount structure 202 via, for example, a suitable first printed circuit board (PCB) (not illustrated). Each of the first light emitters 204 is disposed such that, upon being electrically energized, it emits light in a first direction 224. The first direction 224, as FIG. 2 depicts, is at an acute angle (α) relative to a reference line 226 that extends in a reference direction 228. Although the first light emitters 204 may be implemented using any one of numerous known light emitters, in the depicted embodiment each of the plurality of first light emitters 204 is a light emitting diode (LED).

The plurality of first optics 206 are disposed adjacent to the plurality of first light emitters 204. In particular, each first optic 206 is associated with, and is disposed to receive the light emitted from, a different one of the first light emitters 204. Thus, there is a single first optic 206 associated with each single first light emitter 204. The first optics 206 may be implemented using any one of numerous known optics that are configured to focus the light emitted from the first light emitters 204 into a first light beam 232 that is directed in the first direction 224.

The plurality of second light emitters 208 are coupled to the mount structure via, for example, a suitable second PCB (not illustrated). Each of the second light emitters is disposed such that, upon being energized, it emits light in a second direction 234. The second direction 234 is at an obtuse angle (β) relative to the reference line 226 and the reference direction 228. In the embodiment depicted in FIG. 2, it is seen that the obtuse angle (β) is 180-degrees. Thus, the second direction 234 is parallel to the reference line 226 and is directly opposite the reference direction 228. In the embodiment depicted in FIG. 3, however, the obtuse angle (β) is less than 180-degrees. As with the first light emitters 204, the second light emitters 208 may also be implemented using any one of numerous known light emitters; however, in the depicted embodiment each of the plurality of second light emitters 208 is also an LED.

The plurality of second optics 212 are disposed adjacent to the plurality of second light emitters 208. In particular, each second optic 212 is associated with, and is disposed to receive the light emitted from, a different one of the second light emitters 208. Thus, there is a single second optic 212 associated with each single second light emitter 208. The second optics 212 may be implemented using any one of numerous known optics that are configured to focus the light emitted from the second light emitters 208 into a second light beam 236 that is directed in the second direction 234.

The first lens 214 is coupled to, and encloses, the first light emitters 204 and the first optics 206. Similarly, the second lens 216 is coupled to, and encloses the second light emitters 208 and the second optics 212. The first and second lenses 214, 216 primarily provide protection for the first and second light emitters 204, 208 and the first and second optics 206, 212. However, in some embodiments the first and second lenses 214, 216 may also further shape and/or focus the first and second light beams 232, 236, respectively.

As previously mentioned, in the embodiments depicted in FIGS. 2 and 3, the mount structure 202 comprises the housing 218. The housing 218 is structurally configured in a manner that causes the first light emitters 204 to emit light in the first direction 224 and the second light emitters 208 to emit light in the second direction 234. In particular, the housing 218 includes a first mount surface 238 and a second mount surface 242 on which the first plurality of light emitters 204 and the second plurality of light emitters 208 are mounted, respectively. These mount surfaces 238, 242 are configured such that the first and second light emitters 204, 208, when energized, will emit light in the first and second directions 224, 234, respectively.

As was also previously mentioned, the power supply 222 is disposed within the housing 218. The power supply 222 is electrically coupled to the first light emitters 204 and the second light emitters 208. The power supply 222 also is coupled to receive electrical power from the aircraft 100 and is configured to selectively energize the first light emitters 204 and/or the second light emitters 208. That is, based on a command signal from, for example, the cockpit, the power supply 222 can energize either, or both, of the first and/or the second light emitters 204, 208.

Figure 4:
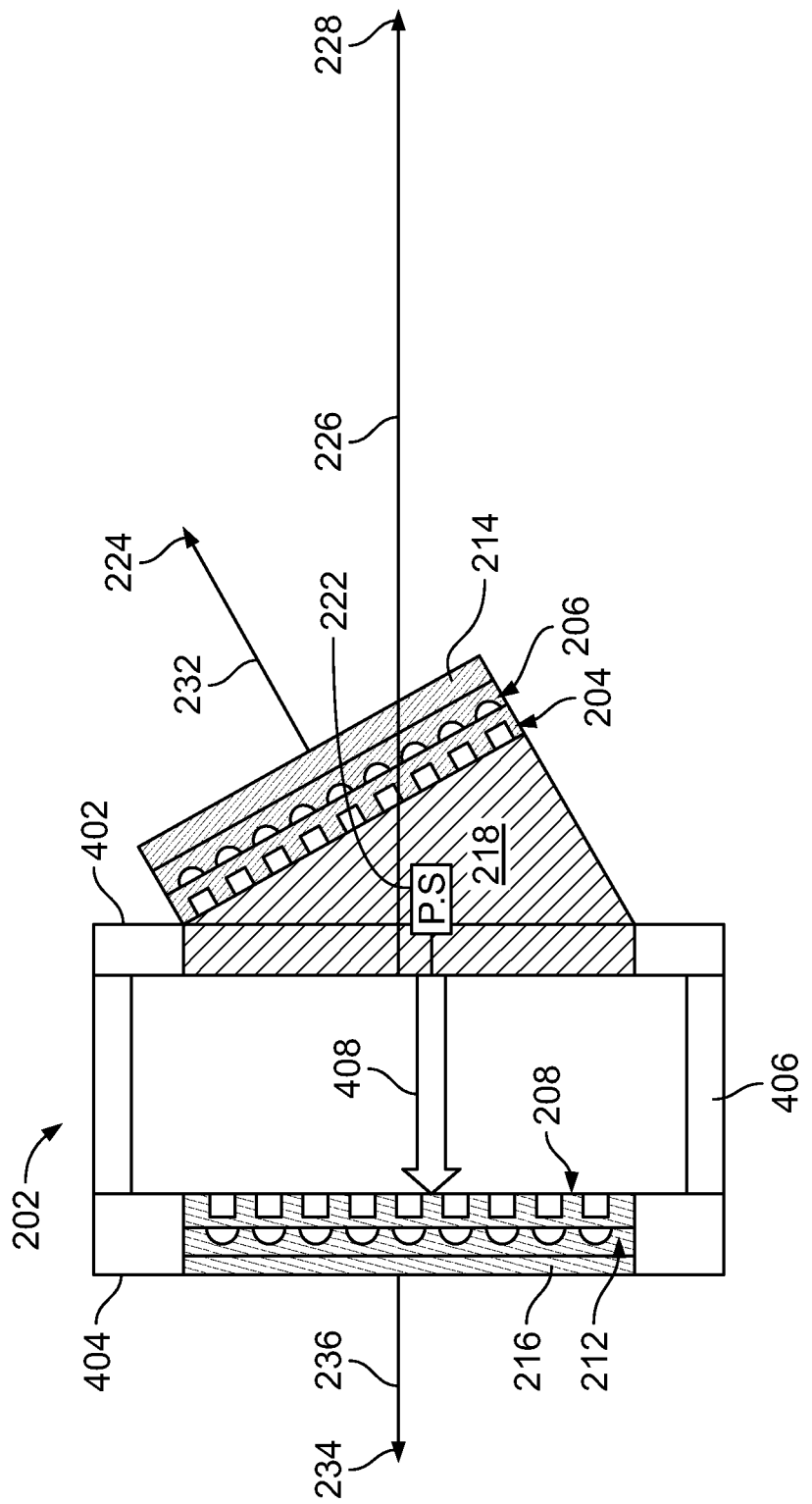
FIG. 4 depicts a simplified side view of yet another embodiment of a dual sided aircraft light assembly that may be mounted on the landing gear of the aircraft in FIG. 1.

In some embodiments, the configuration of the landing gear 108 may not make it possible to mount both the first and second light emitters 204, 208 on the housing 218. This may be due to space constraints or to avoid light blockage by the landing gear 108. No matter the specific reason, for such configurations, the mount structure 202 comprises a plurality of brackets. More specifically, as FIG. 4 depicts, the mount structure 202 comprises a first bracket 402 and a second bracket 404. The first bracket 402 is coupled to the plurality of first light emitters 204, and more specifically to the housing 218. The second bracket 404 is coupled to the plurality of second light emitters 208. The second bracket 404 is also coupled to, and is spaced apart from, the first bracket 402. In the depicted embodiment, a coupler 406 is used to couple the first and second brackets 402, 404 together. As FIG. 4 also depicts, a power line 408 electrically couples the power supply 222 to the second light emitters 208.

Figure 5:
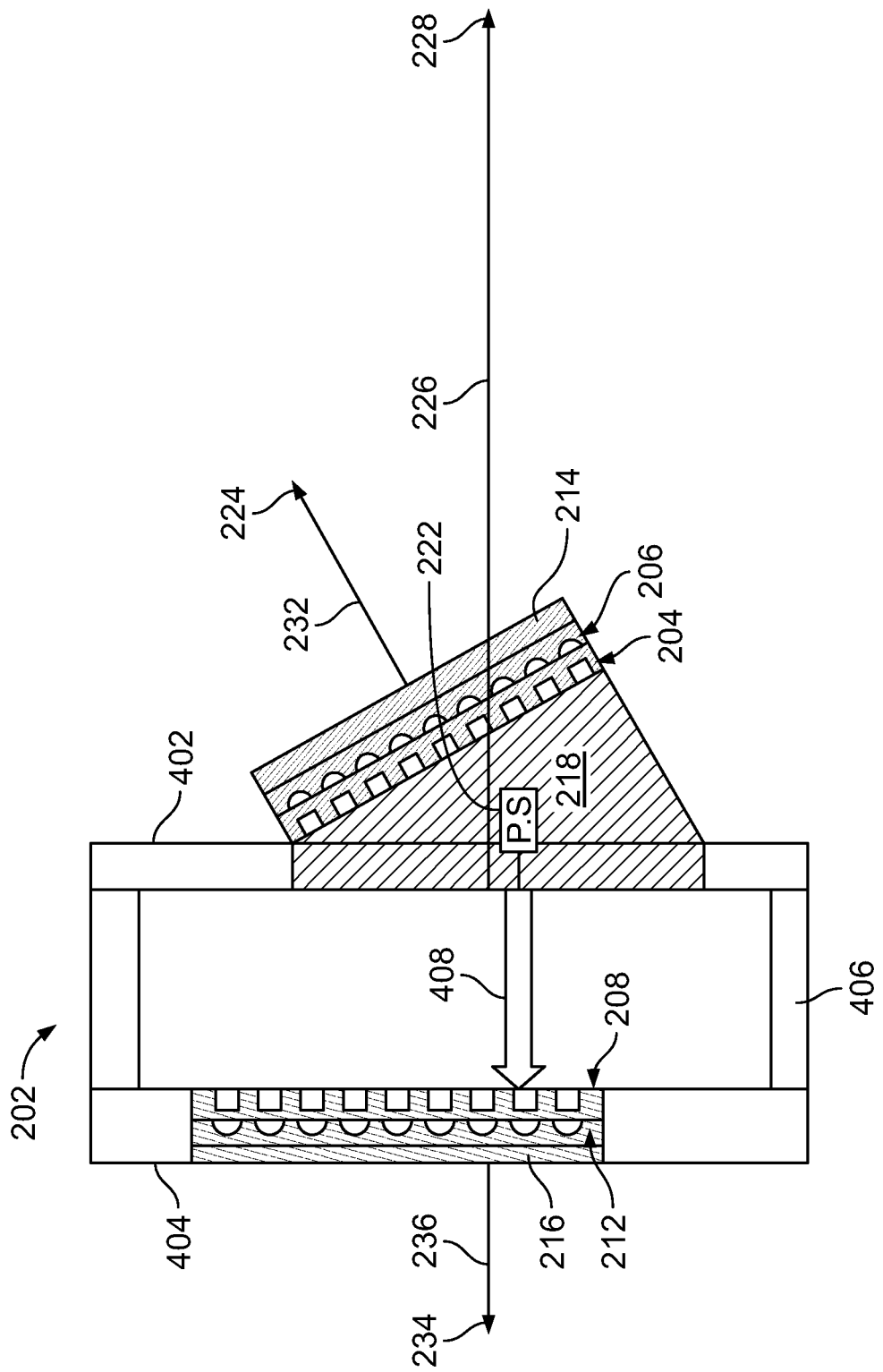
FIG. 5 depicts a simplified side view of one other embodiment of a dual sided aircraft light assembly that may be mounted on the landing gear of the aircraft in FIG. 1.

It should be noted that in some embodiments, such as the embodiments depicted in FIGS. 2 and 4, the second direction 234 is parallel to the reference line 226 and directly opposite the reference direction 228. Moreover, in these embodiments the second plurality of lights 208 are symmetrically disposed relative to the reference line 226. In other embodiments, such as the one depicted in FIG. 5, the plurality of second light emitters 208 are asymmetrically disposed relative to the reference line 226.

The aircraft light assembly disclosed herein can be mounted on the landing gear of an aircraft and can selectively provide illumination both forward and rearward of the aircraft. Thus, the light assembly can be used to provide illumination for landing, taxiing, and pushback operations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A dual sided aircraft light assembly, comprising:
   a mount structure adapted to be mounted to an aircraft landing gear;
   a plurality of first light emitters coupled to the mount structure, each first light emitter disposed such that, upon being electrically energized, first light emitter emits light in a first direction that is at an acute angle relative to a reference line that extends in a reference direction;
   a plurality of first optics disposed adjacent to the plurality of first light emitters, each first optic associated with and disposed to receive the light emitted from a different one of the first light emitters, the first optics configured to focus the light emitted from the first light emitters into a first light beam that is directed in the first direction;
   a plurality of second light emitters coupled to the mount structure, each second light emitter disposed such that, upon being energized, each second light emitter emits light in a second direction that is at an obtuse angle relative to the reference line and the reference direction;
   a plurality of second optics disposed adjacent to the plurality of second light emitters, each second optic associated with and disposed to receive the light emitted from a different one of the second light emitters, the second optics configured to focus the light emitted from the second light emitters into a second light beam that is directed in the second direction;
a first lens coupled to and enclosing the first light emitters and the first optics; and
a second lens coupled to and enclosing the second light emitters and the second optics.

2. The light assembly of claim 1, wherein the mount structure comprises a housing.

3. The light assembly of claim 2, wherein the housing is structurally configured in a manner that causes the first light emitters to emit light in the first direction and the second light emitters to emit light in the second direction.

4. The light assembly of claim 2, further comprising:
a power supply circuit disposed within the housing and electrically coupled to the first light emitters and the second light emitters, the power supply operable to selectively energize the first light emitters and/or the second light emitters.

5. The light assembly of claim 4, wherein the power supply circuit is adapted to be coupled to, and receive electrical power from, an aircraft.

6. The light assembly of claim 1, wherein the mount structure comprises:
a first bracket coupled to the plurality of first light emitters; and
a second bracket coupled to the plurality of second light emitters and coupled to, and a spaced apart from, the first bracket.

7. The light assembly of claim 6, further comprising:
a housing coupled to the first bracket and the first light emitters; and
a power supply circuit disposed within the housing and electrically coupled to the first light emitters and the second light emitters, the power supply circuit operable to selectively energize the first light emitters and/or the second light emitters.

8. The light assembly of claim 7, wherein:
the housing is structurally configured in a manner that causes the first light emitters to emit light in the first direction; and
the second bracket is structurally configured in a manner that causes the second light emitters to emit light in the second direction.

9. The light assembly of claim 8, wherein the power supply circuit is adapted to be coupled to, and receive electrical power from, an aircraft.

10. The light assembly of claim 8, wherein the plurality of second light emitters are asymmetrically disposed relative to the reference line.

11. The light assembly of claim 1, wherein the second direction is parallel to the reference line and directly opposite the reference direction.

12. The light assembly of claim 1, wherein each of the plurality of first light emitters and each of the plurality of second light emitters is a light emitting diode (LED).

13. An aircraft comprising:
a fuselage;
landing gear coupled to the fuselage; and
at least one dual sided aircraft light assembly coupled to at least a portion of the landing gear, the at least one dual sided aircraft light assembly, comprising:
a mount structure mounted on the aircraft landing gear;
a plurality of first light emitters coupled to the mount structure, each first light emitter disposed such that, upon being electrically energized, first light emitter emits light in a first direction that is at an acute angle relative to a reference line that extends in a reference direction;
a plurality of first optics disposed adjacent to the plurality of first light emitters, each first optic associated with and disposed to receive the light emitted from a different one of the first light emitters, the first optics configured to focus the light emitted from the first light emitters into a first light beam that is directed in the first direction;
a plurality of second light emitters coupled to the mount structure, each second light emitter disposed such that, upon being energized, each second light emitter emits light in a second direction that is at an obtuse angle relative to the reference line and the reference direction;
a plurality of second optics disposed adjacent to the plurality of second light emitters, each second optic associated with and disposed to receive the light emitted from a different one of the second light emitters, the second optics configured to focus the light emitted from the second light emitters into a second light beam that is directed in the second direction;
a first lens coupled to and enclosing the first light emitters and the first optics; and
a second lens coupled to and enclosing the second light emitters and the second optics.

14. The aircraft of claim 13, wherein:
the mount structure comprises a housing; and
the housing is structurally configured in a manner that causes the first light emitters to emit light in the first direction and the second light emitters to emit light in the second direction.

15. The aircraft of claim 14, further comprising:
a power supply circuit disposed within the housing and electrically coupled to the first light emitters and the second light emitters, the power supply circuit coupled to receive electrical power from the aircraft and operable to selectively energize the first light emitters and/or the second light emitters.

16. The aircraft of claim 13, wherein the mount structure comprises:
a first bracket coupled to the plurality of first light emitters; and
a second bracket coupled to the plurality of second light emitters and coupled to, and a spaced apart from, the first bracket.

17. The aircraft of claim 16, further comprising:
a housing coupled to the first bracket and the first light emitters; and
a power supply circuit disposed within the housing and electrically coupled to the first light emitters and the second light emitters, the power supply circuit coupled to receive electrical power from the aircraft and operable to selectively energize the first light emitters and/or the second light emitters.

18. The aircraft of claim 17, wherein:
the housing is structurally configured in a manner that causes the first light emitters to emit light in the first direction; and
the second bracket is structurally configured in a manner that causes the second light emitters to emit light in the second direction.

19. The aircraft of claim 13, wherein the second direction is parallel to the reference line and directly opposite the reference direction.

20. The aircraft of claim 13, wherein each of the plurality of first light emitters and each of the plurality of second light emitters is a light emitting diode (LED).

\* \* \* \* \*